United States Patent [19]
Ash

[11] Patent Number: 5,385,005
[45] Date of Patent: Jan. 31, 1995

[54] LAWN TRIMMER/EDGE ATTACHMENT

[76] Inventor: Stephen C. Ash, 130 E. Iris, McAllen, Tex. 78501

[21] Appl. No.: 96,699

[22] Filed: Jul. 12, 1993

[51] Int. Cl.6 .................................................. A01D 34/84
[52] U.S. Cl. ................................. 56/12.7; 56/DIG. 24
[58] Field of Search ..................... 56/12.1, 12.7, 16.7, 56/16.9, 17.1, 17.5, 255, 320.1, DIG. 24, 17.3, 17.4; 172/13, 14, 17

[56] References Cited
U.S. PATENT DOCUMENTS

| | | | |
|---|---|---|---|
| 3,512,343 | 5/1970 | Lange | 56/16.7 |
| 4,587,800 | 5/1986 | Jimenez | 56/16.9 |
| 4,679,385 | 7/1987 | Carmine | 56/16.9 |
| 4,688,376 | 8/1987 | Wolfe, Sr. | 56/16.7 |
| 4,803,831 | 2/1989 | Carmine | 56/16.9 |
| 4,914,899 | 4/1990 | Carmine | 56/16.7 |
| 5,115,870 | 5/1992 | Byrne | 172/17 X |
| 5,226,486 | 7/1993 | Naiser | 56/12.1 X |

*Primary Examiner*—Ramon S. Britts
*Assistant Examiner*—James A. Lisehora

[57] ABSTRACT

An attachment for converting an electric or gasoline powered lawn trimmer into a temporary or permanent lawn edger is described herein.

3 Claims, 1 Drawing Sheet

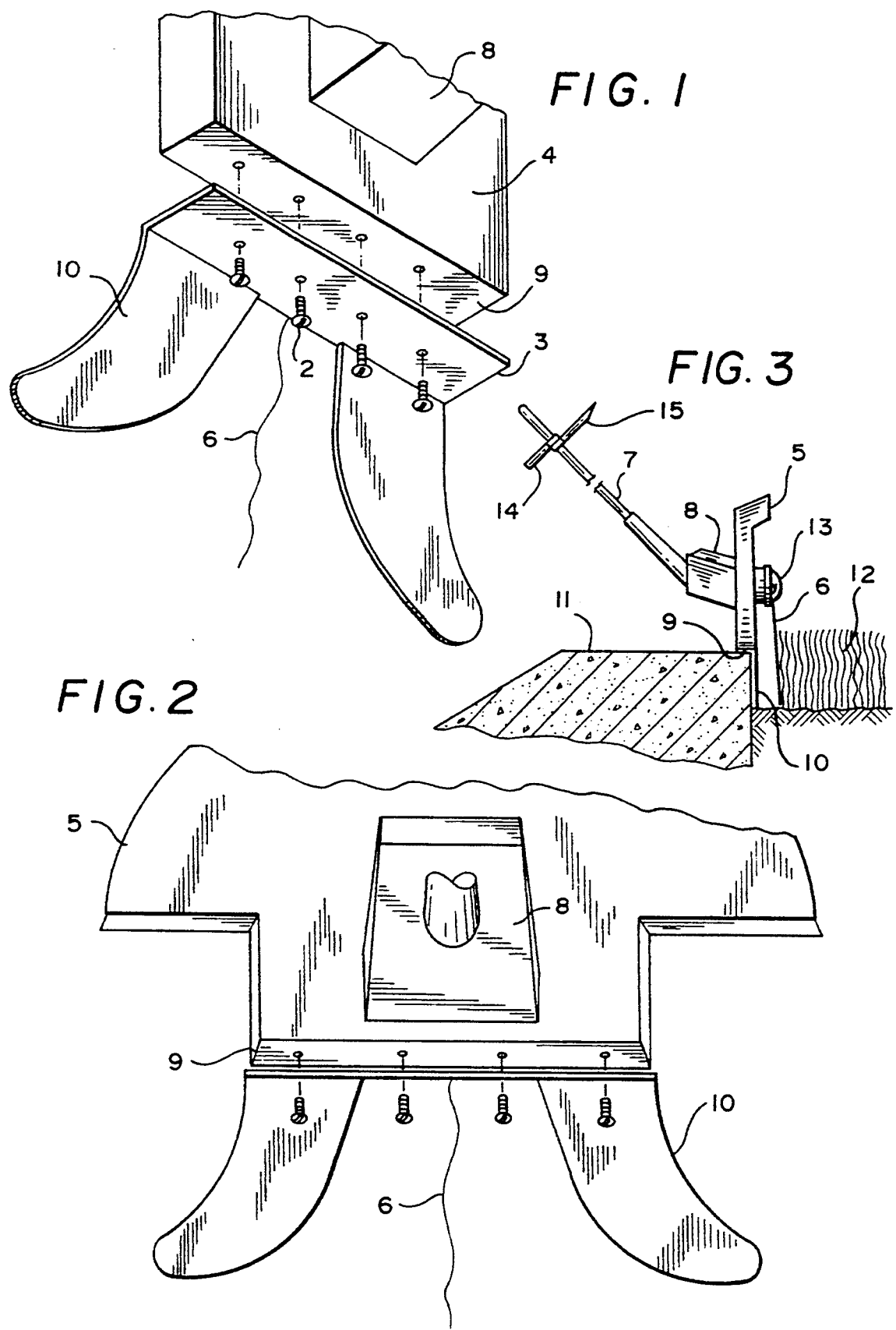

LAWN TRIMMER/EDGE ATTACHMENT

BACKGROUND OF THE DISCLOSURE

The lawn edger attachments of prior art consists of an object attached to the housing of the lawn trimmer in a very complicated manner. The prior apparati rolls along on wheels, parallel to the sidewalk or curb, while the lawn trimmer is engaged in the "on" position. Prior invention art for attachments are available as exemplified by U.S. Pat. Nos. 4,688,376; 4,587,800 and 4,679,385. These prior attempts are extremely complicated and have numerous disadvantages. The edger guider attachment of present invention has several advantages. The main advantage of the present invention is the "winged" shape of the edger guider. At each end of the edger is a "winged" structure that guides and lifts grass and weeds upwards and directly into the path of the perpendicularly/vertical cord trimmer. Once pulled upward into the cutting cord apparatus the weeds and grass are neatly trimmed about 1–2 in. away from the curb or sidewalk. This leaves a groove of 1–1½ inches away from the curb or sidewalk and about 1 inch to 1½ inches deep in to the soil.

Another advantage of present apparatus is that the "wings" extend outward to the length of the cutting cord. This means that the user can use these "wings" to get up close to a young tree or flowers without damaging the bark or stems which prior apparatus failed to provide. Of present invention the cutter apparatus does not cut beyond its radius cutting area. Also, by virtue of the "winged" design of present apparatus the user can use the "wings" to snag certain weeds or grass away from an object to be cut without damaging objects or plants in close proximity. Thus, the edger guider not only has a vertical usage but a horizontal use as well.

A further advantage is that the "wing" shaped design also serves as a stand to balance the total apparatus when it is leaning against a tree, building, or it can be free standing. Prior art failed to address this problem which means user must bend over or stoop to pick up the apparatus. Since present design allows for the total trimmer to stand upright by itself it eliminates back strain or muscle strain to the user.

Another advantage of the edger guider attachment is that it can be permanently or temporarily attached to the lawn trimmer depending on user's purpose.

The lawn edger trimmer attachments of prior inventions are very limited by prior design. By present design, usefulness of such apparatus is improved significantly. Present design allows operator to edge and trim using the same apparatus, by rotating the apparatus 180 degrees. Design of present apparatus mounts directly to the outer face by using 4 screws or bolts and nuts making it easy to attach to lawn trimmers.

SUMMARY OF THE INVENTION

The lawn edger attachment of the present invention is an L-shaped piece of metal or plastic body adapted for securing to a commercially available cord line lawn trimmer. This edger guider is of such novel design that it extends down and out at an angle lifting grass and weeds into the cutting area while it glides along the curb or sidewalk. The present invention allows the attachment to be mounted directly onto the lawn trimmer by using 4 bolts and 4 nuts, a bracket assembly, or 4 self tapping screws depending on the different types of lawn edgers available.

BRIEF DESCRIPTION OF THE INVENTION

So that the manner in which the above recited features, advantages and objects of the present design invention are attained and can be understood in detail, a more particular description of the invention, briefly summarized above, may be had by reference to the embodiment thereof which are illustrated in the appended drawings.

It is to be noted, however, that the appended drawings illustrate only typical embodiments of this invention and are, therefore, not to be considered limiting of its scope, for the invention may admit to other equally effective embodiments.

FIG. 1 is a perspective view of the apparatus as attached to a standard electric or gas powered cord trimmer converted to a lawn edger.

FIG. 2 is a frontal view depicting the uniqueness of present invention to a cord trimmer.

FIG. 3 is a side view of the trimmer attachment as shown in FIG. 2.

DETAILED DESCRIPTION OF THE PREFERRED EMBODIMENT

Referring first to FIG. 2 of the drawings, the apparatus of present design is clearly depicted mounted to a commercially available lawn trimmer. The novel apparatus of present design is made of metal or plastic. The shape of said material is like the letter L. The bottom of the L shaped material becomes the mounting plate to the frontal face lip area of the lawn trimmer. The mounting plate is 4½ inches long and ¾ inches wide. The mounting plate has 4 holes located 1½ inches inward from its edge and spaced 7/8 inches apart. These 4 holes correspond to 4 holes drilled into the front lip edge of the prior art lawn trimmer. Extending downward at each edge of the mounting plate are the present designed metal or plastic "wings". Each "wing" is of such design so that by curving upward they facilitate the grass or weeds along the curb or sidewalk up to the cutting cord of the prior art nylon cord trimmer where the grass can be cut approximately 1 to 2 inches from the sidewalk or curb. This cutting action leaves a gutter that channels water off the sidewalk and back into the lawn. This therefore allows puddles to drain off freely and effortlessly. The entire apparatus used for edging fits between the sidewalk and/or curb and glides quickly down the sidewalk or curb while the user depresses the on button of the prior art trimmer thereby converting the same apparatus into a lawn edger. Furthermore, the design of the present apparatus allows for the "wings" to act as a balance and enables the entire lawn trimmer to stand vertical or perpendicular to the ground when not in operation. Previous art does not have this feature and lawn trimmers by themselves will not stand freely when not in operation causing the user to constantly bend over to pick them up. By constantly bending over to pick up the lawn trimmer user could injure his/her back, leg muscles and/or vertebrae.

For some trimmers that do not have a front lip edge, a metal or plastic bracket would be employed to attach present apparatus to trimmer shaft.

The present invention of the novel apparatus has two major safety features that prior art does not address. Firstly, the present invention allows for the "wings" to be angled greater than perpendicular so that debris is thrown away and downward from operator. Of course most manufacturers warn user to wear goggles when operating lawn trimmers, however, most users neglect wearing them. By angling the edger guider, most debris is thrown into prior art deflecting shield. Furthermore, by changing the angle of the present design attachment, edger user can adjust it to their approximate height. Thus, one does not have to contort their body causing damage to their back or muscles. Two oval shaped handles would be employed as in prior art to facilitate both trimmer apparatus and edging usage.

Referring to FIG. 1 of the drawings, the apparatus of the present invention is clearly shown mounted or attached to a commercially available lawn trimmer. The lawn trimmer includes a motor housing 8 attached to trimmer housing 4 in the front of which is the face lip 9 of prior invention. Of the present invention parallel to the lip face is the novel edger guider attachment 10. The edger guider is attached to the prior lip face 9 by using 4, ¼ by ½ inch metal screws or by using 4 nuts and/or bolts inserted into holes spaced 7/8 inches apart along the edger guider attachment bracket 3. The winged design of the edger guider attachment 10 lifts grass and weeds upwards into the path of the rotating nylon cord 6 to be cut off, approximately 1½-2 inches away from the curb or sidewalk and 1 to 2 inches deep. Since there are two "wings", one at each edge, the apparatus can go in either direction, right to left or left to right. As the "wings" on the edger guider attachment 10 glides parallel to the sidewalk or curb the mounting plate 3 glides along the top of the curb or sidewalk. The edger guider 10 is constructed of metal or plastic as mentioned earlier. It is made of one piece of metal or molded into the prior invention with the mounting bracket 3 being somewhat perpendicular to the edger guider attachment 10.

Referring next to FIG. 3 of the drawings the apparatus of the present disclosure is a side view showing the edger guider attachment 10 attached to the front face 9 of a commercially available lawn trimmer. Attached to the motor housing 8 is the deflecting shield 5. Under the deflecting shield 5 is the nylon cord trimmer housing 13 inside of which contains a spool of nylon cord which protrudes through the opening. This single nylon cord rotates at a very high rate of speed. As it rotates rapidly it cuts grass and weeds that come into contact with the nylon cord 6. As the edger guider glides parallel and perpendicular to the sidewalk and curb 11 it cuts a path about 1-2 inches deep and 1-2 inches wide from the sidewalk or curb to the grass 12. The prior art also has an oval shaped handle 14 mounted on the upper part of the shaft 7 that is used to control the lawn trimmer in the horizontal position. For the same reason an oval shaped handle 13 is mounted to the shaft 7 to control the present apparatus in vertical position when the user is using the present edger guider 10 to edge along sidewalks and curbs 11.

It will be understood that the above mentioned apparatus is uniquely designed to install quickly and easily and weighs only about 2 ounces. It edges neatly along sidewalks and curbs and in areas not usually trimmed by a standard lawnmower.

Be it further understood as many possible embodiments may be made of the invention without departing from the scope thereof. Present art is to be regarded as illustrative rather than restrictive. It is, therefore, to be understood that the invention may be practiced within the scope of the claims otherwise than as specifically described herein.

What is claimed and desired to be protected by U.S. Patent is:

1. In a lawn trimmer of the type having a cutting cord extending outwardly a predetermined distance from a trimmer housing, an edger guider for converting the lawn trimmer into a lawn edger, said edger guider comprising:
    a mounting plate having a length, a width, and first and second ends;
    a first substantially L-shaped planar wing extending along part of said length of said mounting bracket and projecting outwardly from said mounting bracket in a direction perpendicular to both said length and said width;
    a second substantially L-shaped wing projecting outwardly from said mounting bracket, said second wing being substantially coplanar with said first wing and spaced from said first wing along the length of said mounting bracket.

2. The edger guider according to claim 1, wherein said first wing and said second wing are each adapted to extend outwardly from said trimmer housing by said predetermined distance when said edger guider is mounted on said trimmer housing.

3. The edger guider according to claim 1, wherein said first wing is located at said first end of said mounting plate and said second wing is located at said second end of said mounting plate.

* * * * *